United States Patent [19]
Matsumoto et al.

[11] Patent Number: 5,467,005
[45] Date of Patent: Nov. 14, 1995

[54] BATTERY CHARGER WHICH ACCOUNTS FOR INITIAL SURGE IN BATTERY VOLTAGE AND WHICH IS IMMUNE TO NOISE DURING COMPLETION OF CHARGING

[75] Inventors: Toshio Matsumoto; Hideki Watanabe, both of Anjo, Japan

[73] Assignee: Makita Corporation, Japan

[21] Appl. No.: 101,749

[22] Filed: Aug. 4, 1993

[30] Foreign Application Priority Data

Aug. 11, 1992 [JP] Japan ................... 4-236459
May 10, 1993 [JP] Japan ................... 5-108298
May 18, 1993 [JP] Japan ................... 5-115993

[51] Int. Cl.$^6$ .............................. H02J 7/00; H01M 10/44
[52] U.S. Cl. .............................. 320/20; 320/31
[58] Field of Search ................... 320/20, 27, 30, 320/31, 48

[56] References Cited

U.S. PATENT DOCUMENTS 4,639,655  1/1987  Westhaver et al. ............... 320/14
4,998,057  3/1991  Shinohara et al. .
5,206,579  4/1993  Kawate et al. ................... 320/20
5,229,705  7/1993  Kato .............................. 320/20

FOREIGN PATENT DOCUMENTS 3040852    6/1982   Germany .
3308515    9/1983   Germany .
3901096    8/1989   Germany .
61-288740  12/1986  Japan .
63-234844  9/1988   Japan .
4-58471    2/1992   Japan .
2120472    3/1983   United Kingdom .

Primary Examiner—Peter S. Wong
Assistant Examiner—Robert Nappi

[57] ABSTRACT

A battery charger includes a circuit for detecting battery voltage (V1) appeared when a predetermined time (T1) has elapsed after starting a charging operation. The determination as to whether the battery has been fully charged is performed after the battery voltage has reached the sum of a predetermined potential difference (dVS) and the battery voltage (V1).

4 Claims, 11 Drawing Sheets

BATTERY CHARGER WHICH ACCOUNTS FOR INITIAL SURGE IN BATTERY VOLTAGE AND WHICH IS IMMUNE TO NOISE DURING COMPLETION OF CHARGING

BACKGROUND OF THE INVENTION

1. Field of the Invention

The present invention relates to a battery charger for use with a chargeable battery such as a Ni-Cd battery.

2. Description of the Prior Art

Generally, when a battery is charged, its voltage varies with time as shown by line A in FIG. 1(A). At the beginning of a charging operation, the battery voltage increases relatively rapidly (see line part A1). The battery voltage thereafter gently increases (see line part A2) with time, and the rate of increase is again raised at a time immediately before the battery is fully charged (see line part A3). If the charging operation is still continued after the battery has been fully charged, the battery voltage decreases with time. Thus, the battery voltage will have a peak value at the time when the battery is fully charged. Various techniques have been proposed to utilize this phenomenon for stopping the charging operation, by means of detection of a timing of conversion from the increasing tendency to the decreasing tendency, at the time when the battery is fully charged.

Japanese Laid-Open Patent Publication No. 63-234844 discloses a technique to detect the battery voltage at intervals of a predetermined period and to stop the charging operation when the battery voltage is decreased continuously by a number of times more than a predetermined number, so that the charging operation can be stopped immediately after the battery has been fully charged.

With this technique, however, the charging operation for the battery cannot be successfully performed when the battery is an over-discharged one. When the over-discharged battery is charged, the battery voltage firstly abruptly increases as indicated by line part A5 in FIG. 1(A), and subsequently decreases with time (see line part A6). The battery voltage thereafter increases in the same pattern as the normal battery. According to the technique of detecting merely the timing when the battery voltage is converted from the increasing tendency to the decreasing tendency, the timing of the conversion from line part A5 to line part A6 is detected. Therefore, the charging operation is stopped when the battery is short of charging.

In order to prevent such malfunction, various techniques have been also proposed. Japanese Laid-Open Patent Publication No. 4-58471 discloses a technique in which the determination as to whether the battery voltage has reached the peak value is not performed so long as the battery voltage is less than a predetermined value. Japanese Laid-Open Patent Publication No. 61-288740 discloses a technique in which the determination as to whether the battery voltage has reached the peak value is not performed until the battery voltage begins to stably increase. Japanese Laid-Open Patent Publication No. 63-234844 mentioned above discloses a technique in which the determination as to whether the battery voltage has converted from the increasing tendency to the decreasing tendency is not performed until a predetermined time elapses after starting the charging operation.

With the technique of Japanese Laid-Open Patent Publication No. 4-58471 or the technique in which the determination as to whether the battery voltage has reached the peak value is inhibited as long as the battery voltage is less than the predetermined value, it is difficult to charge batteries having different rating voltages by using a common battery charger. For example, in order to make the battery charger applicable for charging both batteries having rating voltages of 12.0 V and 7.2 V, the predetermined value must be determined to be higher than a peak voltage (V7 in FIG. 1(A)) which may be produced at the beginning of the charging operation of the over-discharged 12.0 V battery. However, if the predetermined value has been determined to be such a higher value, it becomes impossible to determine as to whether the voltage of the 7.2V battery has reached a peak value properly corresponding to a peak voltage (V8 in FIG. 1(A)) which may appear at the fully charged situation. Thus, with the technique in which the determination as to whether the battery voltage has reached the peak value is performed with reference to the predetermined value, batteries having different rating voltages cannot be charged by using a common battery charger.

With the technique of Japanese Laid-Open Patent Publication No. 61-288740, or the technique in which the determination as to whether the battery voltage has reached the peak value is not performed until the battery voltage begins to stably increase, and with the technique of Japanese Laid-Open Patent Publication No. 63-234844 in which the determination as to whether the battery voltage has reached the maximum value is not performed until the predetermined time elapses after starting the charging operation, the determination may be started from the state corresponding to line part A2 in FIG. 1(A). Here, the battery voltage during the period of line part A2 stably increases though gently, and therefore, the determination for the peak value is expected to be properly performed. However, in a practical charging operation at a working place, a high-power-output motor may be operated to be started and stopped in some cases, so that the power source voltage may be varied with such operation of the motor. Therefore, during the period of line part A2, the battery voltage may be temporarily dropped under the influence of the variation of the power source voltage. Such temporary drop of the voltage may be also caused when the contacting condition between the battery and the battery charger is varied. When this occurs, the charging operation is stopped before the battery is fully charged, so that the problem of shortness of charge may be caused in spite of applications of these techniques. Particularly in case of application of the technique of Japanese Laid-Open Patent Publication No. 63-234844, it is necessary to prevent over-charge of the battery when the battery already charged is recharged, and therefore, the predetermined time cannot be determined so long. Thus, the period indicated by line part A2 will become the subject of the determination in this technique.

SUMMARY OF THE INVENTION

It is, accordingly, an object of the present invention to provide a battery charger which is operable to commonly detect either the timings of full charging of batteries having different rating voltages.

It is a further object of the present invention to provide a battery charger which is operable to correctly determine the timing of full charging of a battery even if power source voltage is varied with the time.

In order to attain the above objects, the battery charger according to the present invention is constructed such that the determination is not performed during the period when the variation in battery voltage is gentle and when the battery voltage is liable to be influenced by noises, while the determination is performed during the period when the variation in battery voltage is relatively large and when the influence of the noises is relatively small.

The construction of the present invention is generally shown by a block diagram in FIG. 1(B). The battery charger shown in FIG. 1(B) is operable to charge a plurality of batteries having different rating voltages. However, for ease of explanation, the construction of the present invention will be explained in connection with a battery charger applied to charge two types of batteries which have different rating voltages and have battery voltages varying with time as indicated in FIG. 1(A).

The battery charger according to the present invention includes the following circuits A to D:

Circuit A

The circuit A detects and stores battery voltage (V1) when a predetermined time (T1) has elapsed after starting the charging operation. More specifically, battery voltages V1(A) and V1(B) are detected and stored for batteries A and B, respectively.

Circuit B

The circuit B compares battery voltage V1(A) or V1(B) with a predetermined value to distinguish the rating voltage of the battery to be charged. Thus, the distinction between the batteries A and B can be performed through comparison of voltage V1(A) or V1(B) with the predetermined value.

Circuit C

The circuit C detects the timing when the battery voltage is converted from an increasing tendency to a decreasing tendency for each battery. In case of FIG. 1(A), timings T2(A) and T2(B) are detected for the batteries A and B, respectively. This circuit C however starts the detection only after the battery voltage has reached a value corresponding to the sum of battery voltage V1(A) and a predetermined potential difference dVS(A) in case of the battery A, and after the battery voltage has reached a value corresponding to the sum of battery voltage V1(B) and a predetermined potential difference dVS(B) in case of the battery B. The circuit C does not start the detection before the battery voltage reaches the aforementioned values. Here, the potential differences dVS(A) and dVS(B) are determined according to the rating voltages of the batteries A and B, respectively. Thus, the detection of timing is started after the battery voltage has increased more than the value V1(A)+ dVS(A) in case of the battery A, and after the battery voltage has increased more than V1(B) dVS(B) in case of the battery B.

Circuit D

The circuit D is operable to stop supply of the charging current when the circuit C detects the aforementioned timings.

Here, the predetermined time (T1) is determined to be substantially equal to the time when the abrupt variation in the battery voltage appearing at the beginning of the charging operation of the over-charged battery is diminished after the charging operation has been started. More specifically, the abrupt variation includes a temporary increase appeared in line part A5 and a temporary decrease appeared in line part A6.

Preferably, the circuit C for detecting the timing when the battery voltage is converted from the increasing tendency to the decreasing tendency includes a circuit for detecting the battery voltage at intervals of a predetermined period, a circuit for extracting the maximum voltage from the detected battery voltage and for storing the maximum voltage, and a circuit for comparing the battery voltage as detected with the maximum voltage, so that the timing is detected according to the condition as to whether the battery voltage equal to or lower than the maximum voltage has been continuously detected.

Here, the number of times of continuous detection of the battery voltage equal to or lower than the maximum voltage is preferably counted in such a manner that the timing of detection of the battery voltage equal to maximum value is taken as one time and that the timing of detection of the battery voltage lower than the maximum value is taken as n times (n: integer of two or more).

It is further preferable for the charging operation to be stopped when a variation in the battery voltage during a second predetermined period becomes equal to the subtraction of a predetermined value from the maximum variation in the battery voltage among those detected during the second predetermined periods. The predetermined value is preferably determined according to the rating voltage.

In operation of the battery charger including the circuits A to D as described above, the voltages V1(A) and V1(B) are detected and stored for the batteries A and B, respectively (voltages V1(C), V1(D)—will be detected in case of batteries C, D—of the other different types). The predetermined time T1 is determined to be substantially equal to the time when the abrupt variation in the battery voltage appearing at the beginning of the charging operation of the over-charged battery is diminished after the charging operation has been started. Therefore, the voltages V1(A), V1(B)— properly correspond to the rating voltages of the batteries A, B—, respectively. Since the circuit performs the comparison based on either one of these voltages V1(A), V1(B)—, the charged battery can be reliably distinguished with respect to the rating voltage.

After the rating voltage has been thus distinguished, any one of the predetermined potential differences dVS(A), dVS(B) is selected for the distinguished rating voltage, and the determination as to whether the battery voltage has become maximum is not performed until the battery voltage reaches the value V1(A)+dVS(A) in case of the battery A, and until the battery voltage reaches the value V1(B)+ dVS(B) in case of the battery B. Thus, the determination is performed when the battery voltage reaches the value V1(A)+ dVS(A) in case of the battery A, and when the battery voltage reaches the value V1(B)+dVS(B) in case of the battery B. The value V1(A)+dVS(A) and the value V1(B)+ dVS(B) are substantially equal to the voltages which may be present at the beginning of periods (corresponding to the beginning of line parts A3 and B3) during which the rate of increase of the voltage is raised immediately before the battery is fully charged, respectively.

Thus, with the provision of the circuits (A to D), in response to the rating voltage of the battery to be charged, the timing of conversion of the battery voltage from the increasing tendency to the decreasing tendency is detected after the rate of increase of the battery voltage has become raised. In case of the battery A, the conversion from the increasing tendency to the decreasing tendency may not be detected during the period of line parts A1, A5 and A6 but also the period of line part A2. The determination is thus performed only after reaching the period of line part A3.

The rate of increase of the voltage is raised after reaching the period of line part A3, and the conversion from the increasing tendency to the decreasing tendency is detected based on a remarkable change of voltage. Therefore, the timing of full charging of the battery can be correctly detected irrespective of the presence of the variation in the power source voltage.

This is conversely explained by stating that the detection of timing of full charging is performed only in the situation where the relatively lower accuracy is permitted for detection of the battery voltage. Therefore, the battery charger can be constructed by relatively inexpensive components.

Additionally, as described above, the detection of timing of full charging is performed by means of comparison of the battery voltage with the maximum voltage, and more specifically, the timing of conversion from the increasing tendency to the decreasing tendency is determined on the condition that the battery voltage is lower than the maximum voltage in a continuous manner. Particularly, the battery voltage is detected at intervals of the period as shown in FIG. 2(A) to obtain the maximum voltage. The timing of conversion from the increasing tendency to the decreasing tendency is detected by utilizing a counter which performs a counting process as shown in FIG. 2(B), so that the timing of conversion can be correctly detected without being influenced by the variation in the power source voltage, etc.

The timing of conversion from the increasing tendency to the decreasing tendency is more reliably and rapidly detected by performing the counting process such that the detection of the battery voltage equal to the maximum voltage is taken as one time and that the detection of the battery voltage lower than the maximum voltage is taken as n times (n: integer of two or more) as shown in FIG. 2(C).

Preferably, in order to stop the charging operation, variation $dV1$, $dV2$,—in the battery voltage is detected at intervals of a second predetermined period $dT1$ as shown in FIG. 8 so as to extract the maximum variation from the detected variation ($dV4$ is the maximum variation in case of FIG. 8). The charging operation is stopped at the timing when the variation as detected has become equal to the subtraction of a predetermined value from the maximum variation. The predetermined value is determined for each of the rating voltages, so that the charging operation can be stopped at the timing of full charging for any batteries having different rating voltages.

The invention will become more apparent from the appended claims and the description as it proceeds in connection with the drawings.

DETAILED DESCRIPTION OF THE PREFERRED EMBODIMENT

An embodiment of the present invention will now be explained with reference to the accompanying drawings.

Figure 3:
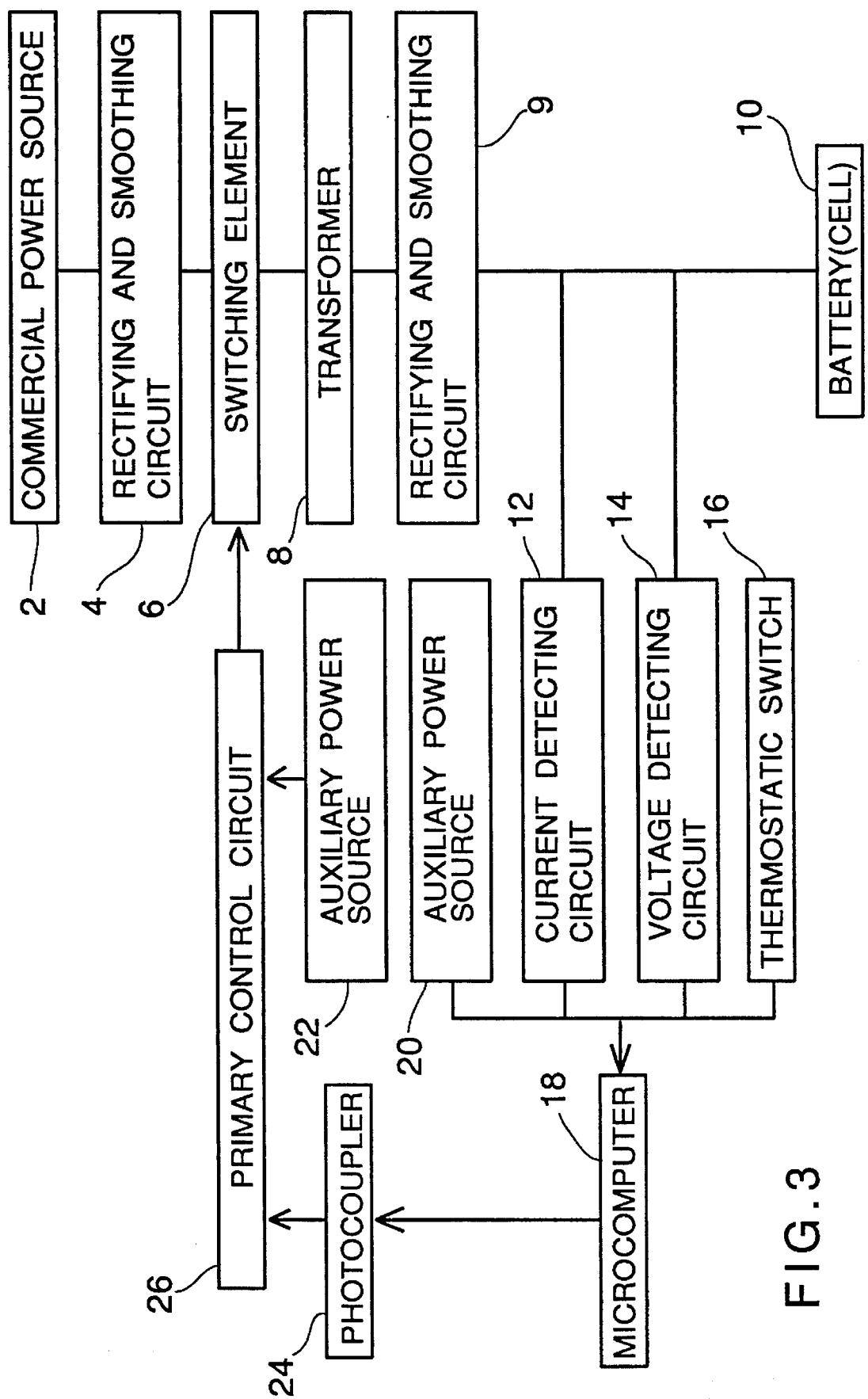
FIG. 3 is a block diagram showing a system of a battery charger according to an embodiment of the present invention.

Referring to FIG. 3, a system of a battery charger of this embodiment is shown in a block diagram. The current supplied from a commercial power source 2 is rectified and is thereafter smoothed by a rectifying and smoothing circuit 4. A switching element 6 performs an ON/OFF control of the current flowing out of the rectifying and smoothing circuit 4. A transformer 8 serves to drop the voltage of the power from the commercial power source 2 and serves to supply a charging current to the secondary side. The charging current is rectified and smoothed by a rectifying and smoothing circuit 9 and is thereafter supplied to a battery 10. The battery 10 includes therein a plurality of cells each having a rating voltage of 1.2 V. The battery charger of this embodiment is applicable to the battery 10 having a rating voltage of 7.2 V and including six of the cells, to one having a rating voltage of 9.6 V and including eight of the cells, or to one having a rating voltage of 12.0 V and including ten of the cells.

A charging current detecting circuit 12 and a battery voltage detecting circuit 14 are provided on the secondary side of this system. A thermostatic switch or thermostat 16 is also provided on the secondary side and is operable to be turned on and off in response to increase of temperature. A microcomputer 18 receives outputs from these circuits and switch. An auxiliary power source 20 is provided on the transformer 8 and supplies a power source voltage to the microcomputer 18. The microcomputer 18 performs a process as will be hereinafter explained, according to a predetermined program. The result of the process is transmitted to a primary control circuit 26 via a photocoupler 24. The primary control circuit 26 controls on and off of the switching element 6 according to the result of the process performed by the microcomputer 18. A drive voltage for the primary control circuit 26 is supplied from the auxiliary power source 22 provided on the transformer 8.

According to the output from the charging current detecting circuit 12, the microcomputer 18 is operable to adjust the duty ratio of the switching element 6 such that the charging current has substantially a constant value. Further, according to processes shown in FIGS. 4 and 5, the microcomputer 18 is operable to fix the switching element 6 to an off-turning position when the battery 10 has been fully charged. Thus, the microcomputer 18 is operable to stop the charging operation.

Figure 4:
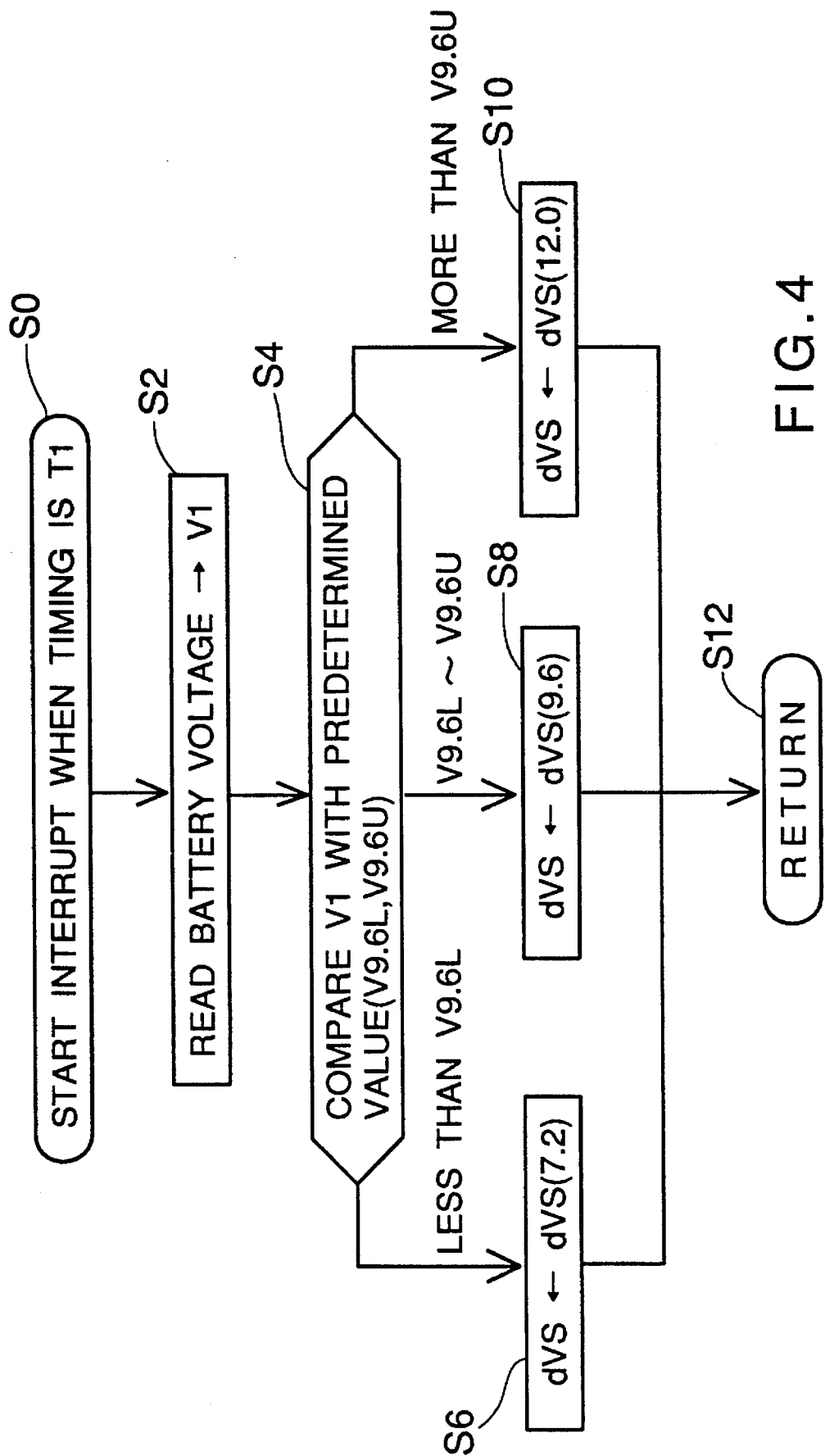
FIG. 4 is a block diagram showing a process performed in the embodiment.

The process shown in FIG. 4 is performed by the microcomputer 18 and serves to perform interruption when the predetermined time T1 has elapsed after starting the charging operation as indicated by Step SO.

Figure 1A:
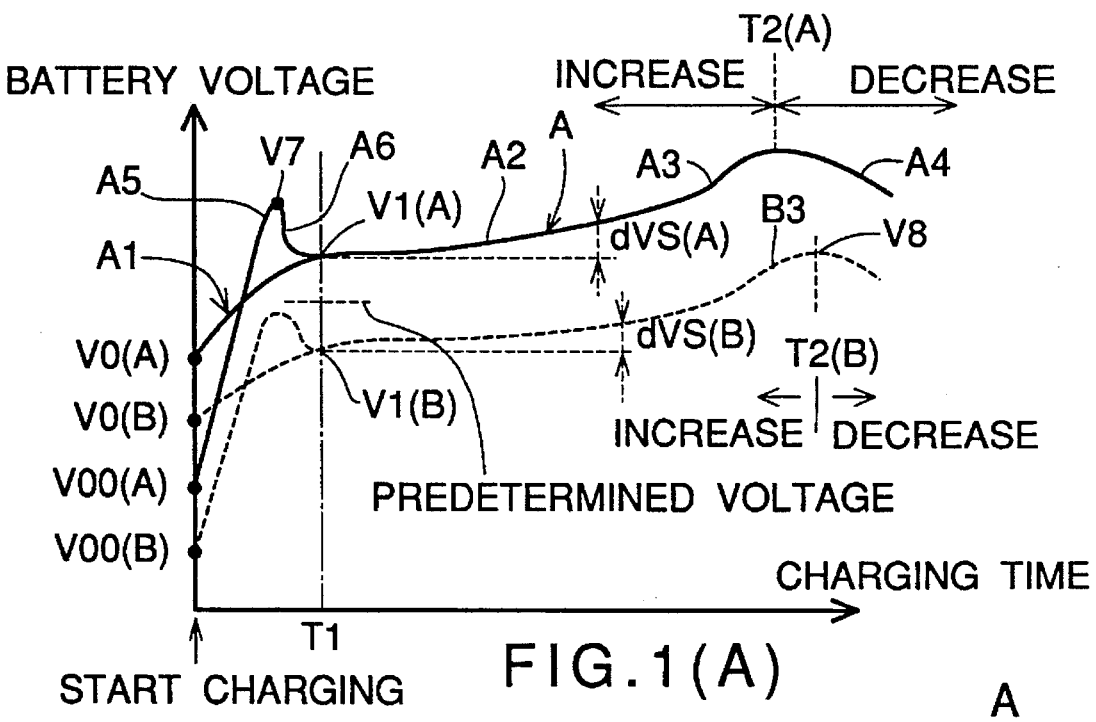
FIGS. 1(A) and 1(B) are diagrams generally showing the construction and the operation of the present invention.

The predetermined time T1 is determined to correspond to the time when an abrupt variation (as indicated by line parts A5 and A6 in FIG. 1(A)) in the battery voltage at the beginning of the charging operation is substantially diminished. After the time T1 has elapsed from starting of the charging operation, the battery voltage may have a value properly corresponding to the rating voltage of the battery 10 irrespective of degree of discharge at the beginning of the charging operation. On the other hand, the battery voltage at the beginning of the charging operation does not correspond to the rating voltage in some cases. For example, battery voltage V0(A) for the battery 10 having the rating voltage of 12.0 V may have a value lower than that of battery voltage VO(B) for the battery 10 having the rating voltage of 7.2 V. This problem may not occur after the time T1 has elapsed from starting of the charging operation. Further, the abrupt variation caused at the beginning of the charging operation of the over-discharged battery 10 will be diminished after the time T1 has elapsed. Consequently, it may not cause the problem that the battery voltage for the battery 10 having a lower rating voltage becomes higher than that for the battery 10 having a higher rating voltage.

According to this knowledge, the process shown in FIG. 4 is programmed to be performed after the predetermined time T1 has elapsed from starting of the charging operation. Firstly, the battery voltage at that time is detected and is stored as the detected battery voltage V1 in Step $2. Thus, Steps SO and $2 provide the circuit A which detects the battery voltage when the predetermined time has elapsed after starting the charging operation.

The process then proceeds to Step S4 in which the detected battery voltage V1 is compared with the predetermined voltage. As described above, the battery charger of this embodiment is intended to be used to charge the battery 10 having any of the rating voltages 7.2 V, 9.6 V and 12.0 V. In order to distinguish between the rating voltages 7.2 V and 9.6 V and between the rating voltages 9.6 V and 12.0 V, voltages V9.6L and V9.6U are utilized as the predetermined voltages, respectively. The voltage V9.6L is determined to have a value slightly smaller than the minimum value of the battery voltage which may be produced during the charging operation for the predetermined time T1 of the battery 10 having the rating voltage of 9.6 V. The voltage V9.6U is determined to have a value slightly larger than the maximum value. Thus, the microcomputer 18 determines that the battery 10 having the rating voltage of 7.2 V is charged if V1≧V9.6L, and that the battery 10 having the rating voltage of 9.6 V is charged if V9.6L<V1<V9.6U, and that the battery 10 having the rating voltage of 12.0V is charged if V1≧V9.6U.

Thus, the process in Step S4 provides the circuit B for comparing the battery voltage (V1) with the predetermined voltage so as to distinguish the battery according to the rating voltage. As shown in FIG. 4, the process proceeds to Step S6, if the battery 10 is one having the rating voltage of 7.2 V. The process proceeds to Step S8 if the battery 10 is one having the rating voltage of 9.6 V. The process proceeds to Step S10 if the battery 10 is one having the rating voltage of 12.0 V. Steps S6, S8 and S10 store dVS(7.2), dVS(9.6) and dVS(12.0) determined according to the rating voltages as the predetermined potential difference dVS, respectively.

The process is once finished after completion of the above steps (see Step S12). After the predetermined period has elapsed from completion of the process in FIG. 4, the process shown in FIG. 5 interrupts. Here, the process shown in FIG. 5 interrupts at intervals of the predetermined period (see Step S14). The process proceeds from Step S14 to Step S16 in which the microcomputer 18 reads the battery voltage at that time and stores the read voltage as VN. The voltage VN is then compared with the maximum voltage VPEAK which is the maximum voltage among the values of the voltage VN read by that time. If the voltage VN at that time exceeds the maximum voltage VPEAK or if the determination in Step S18 is NO, the microcomputer 18 resets the maximum voltage VPEARK to the value of the voltage VN at that time (Step S20). If the maximum voltage VPEAK previously determined is equal to or more than the voltage VN, the process skips Step S20. As long as the battery voltage is of the increasing tendency, or VN>VPEAK, the value of a counter is set to "0" (Step S22). The process proceeds to Step S36 to be once finished as long as the battery voltage is of the increasing tendency, and Steps S24 and its subsequent steps may not be performed.

The process proceeds from Step S18 to Step S24 if the battery voltage VN at that time is equal to or less than the maximum voltage VPEAK previously determined. In Step S24, the microcomputer 18 compares the battery voltage VN with the sum of the predetermined potential difference dVS and the battery voltage V1 detected when the predetermined time T1 has elapsed after starting the charging operation. Here, the time T1 is that stored in Step S2 shown in FIG. 4. Further, the potential difference dVS is that determined by any one of Steps S6, S8 and S10 in response to the rating voltage.

Step S24 provides the determination as to whether the process should skip Step S26 and its subsequent steps. The process skips these steps if the determination is NO, while the process proceeds to these steps if the determination is YES.

The microcomputer 18 determines, through Step S26 and its subsequent steps, the timing when the battery voltage VN is converted from the increasing tendency to the decreasing tendency. More specifically, the counter is incremented by "2" (Step S28) if the battery voltage VN at that time is lower than the maximum voltage VPEAK, while the counter is incremented by "1" if they are equal to each other. (This process is not applied to the case of VN>VPEAK by means of Step S18.) This may result in that the number of continuous detection of the relationship VN≦VPEAK is counted by the counter. Further, in this counting process, the detection of VN=VPEAK is counted as one time while the detection of VN<VPEAK is counted as two times, so that a weighted counting operation is performed for the detection of actual decrease of the voltage.

Figure 5:
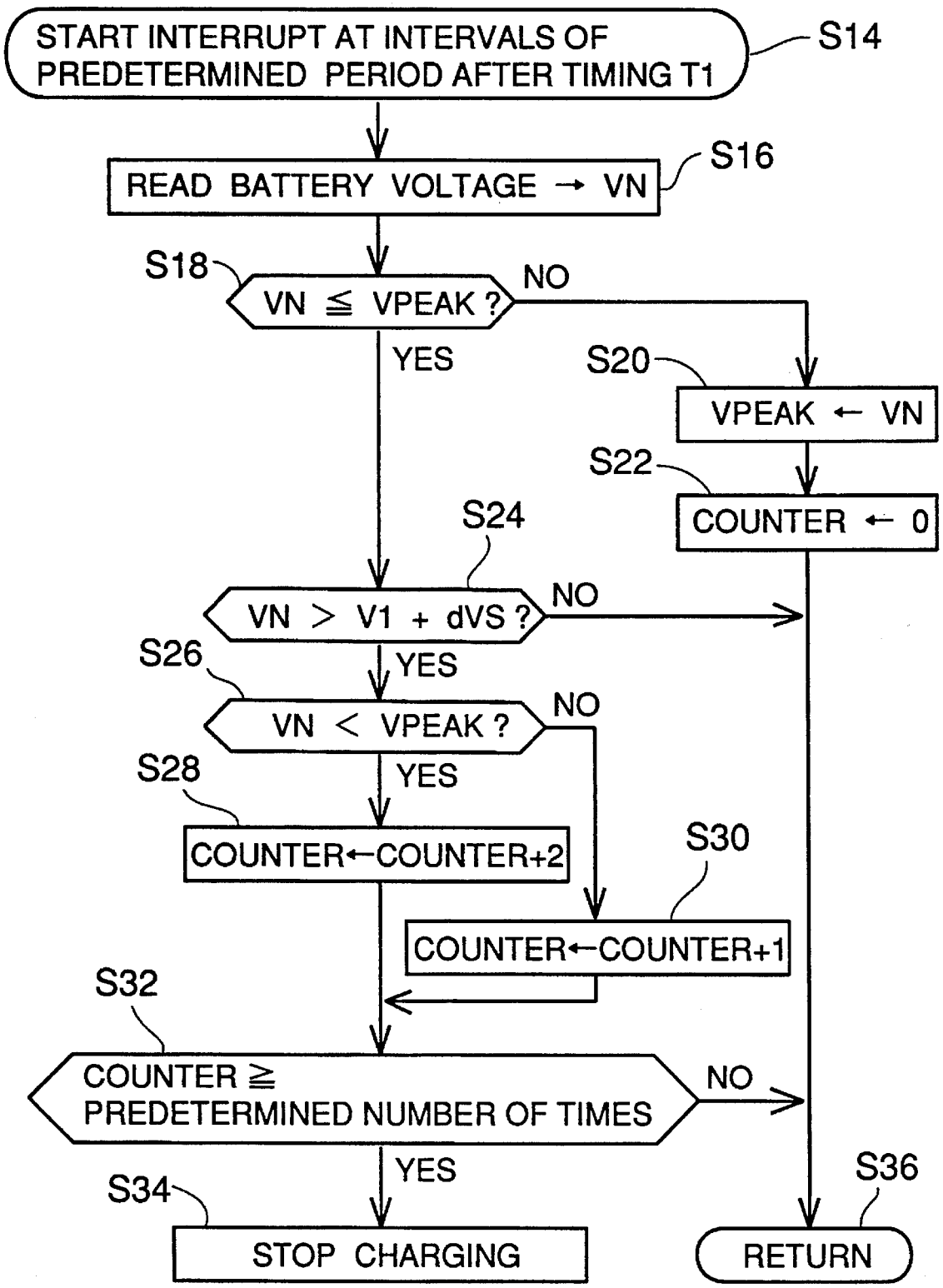
FIG. 5 is a block diagram showing another process performed in the embodiment.

The number thus counted is compared with a predetermined number in Step S32. The charging operation is stopped in Step S34 or the switching element 6 is kept to be turned OFF when the detection of the relationship VN<VPEAK is counted by a number equal to or more than the predetermined number. The determination in Step S32 becomes NO until the counted number reaches the predetermined number, and therefore, the process shown in FIG. 5 is repeatedly performed. When the relationship VN>VPEAK has resulted, the determination in Step S18 becomes NO, and the counter is reset to "0" (Step S22). Thus, with this process, the charging operation is not stopped even if the relationship VN≦VPEAK has once resulted, while the charging operation is stopped when the relationship VN≦VPEAK has continuously resulted.

As described above, since the weighted counting operation is performed for the relationship VN<VPEAK in case of the actual decrease of the battery voltage, the determination in Step S32 promptly becomes YES in such a case. Although the counter is incremented by "2" in Step S28 in this embodiment, the counter may be incremented by "3", "4", "5". . .

In this embodiment, Steps S26 to S32 provide the circuit for determining the timing of conversion from the increasing tendency to the decreasing tendency of the battery voltage. Since such determination is performed only in the case that the determination in Step S24 has become YES, the circuit for determining the timing is operated after the battery voltage VN has reached the value equal to the sum of the predetermined potential difference dVS and the battery voltage V1 obtained when the determined time T1 has elapsed. For this reason, Step S34 for stopping the charging operation is performed when the conversion from the increasing tendency to the decreasing tendency has been detected through Steps S26 to S32.

Figure 6:
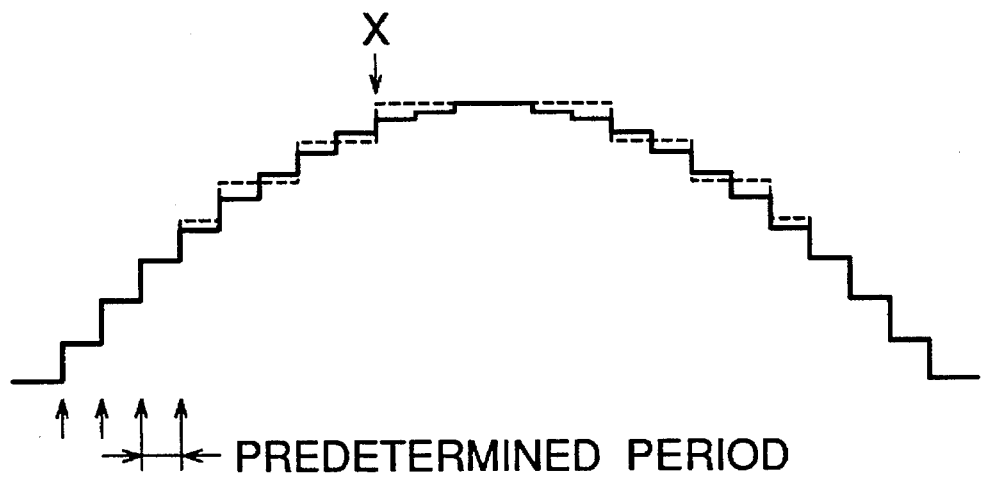
FIG. 6 is an explanatory diagram of the operation of the embodiment.

The advantageous features of this embodiment will now be explained with reference to FIG. In this embodiment, the conversion from the increasing tendency to the decreasing tendency is detected at the time immediately before the battery is fully charged and at the time when the rate of increase of the battery voltage has been considerably raised. Thus, the conversion is detected when the variation in the battery voltage within the predetermined period is relatively large. This may permit the detecting accuracy of the voltage to be relatively rough. Therefore, for example, the detection may be performed such that a practical variation shown by a solid line is taken as a variation indicated by a dotted line (the dotted line corresponds to a rough resolution power). Such a rough resolution power may prevent a smaller variation in the battery voltage from being accidentally detected as the conversion from the increasing tendency to the decreasing tendency. In case of the rough resolution power, the delay of detection may be apprehended. However, in this embodiment, the counter counts not only the period for VN<VPEAK but also the period for VN=VPEAK. The counting operation is therefore still performed after the time indicated by X in FIG. 6, so that the detected timing may substantially correspond to that of the actual conversion from the increasing tendency to the decreasing tendency.

As described above, the detecting performance of the timing of the conversion may not be degraded even if the detection is performed with the rough resolution power. Therefore, relatively inexpensive electronic components can be used for the detecting circuit.

Figure 12:
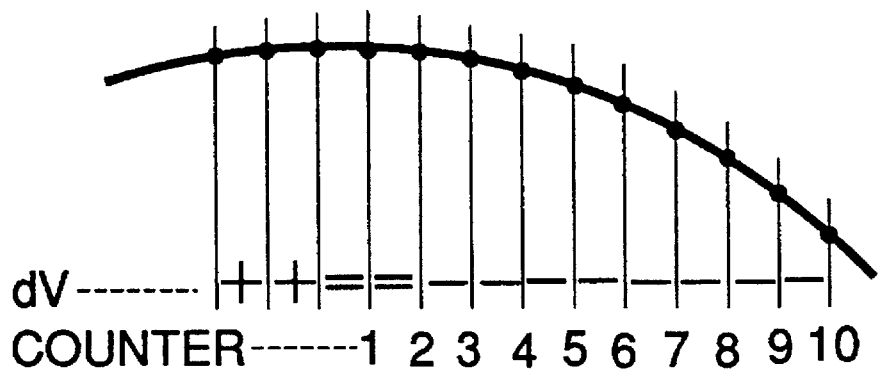
FIGS. 12 and 13 are graphs showing, in enlarged scale, variation in the battery voltage around a peak voltage.
Figure 13:
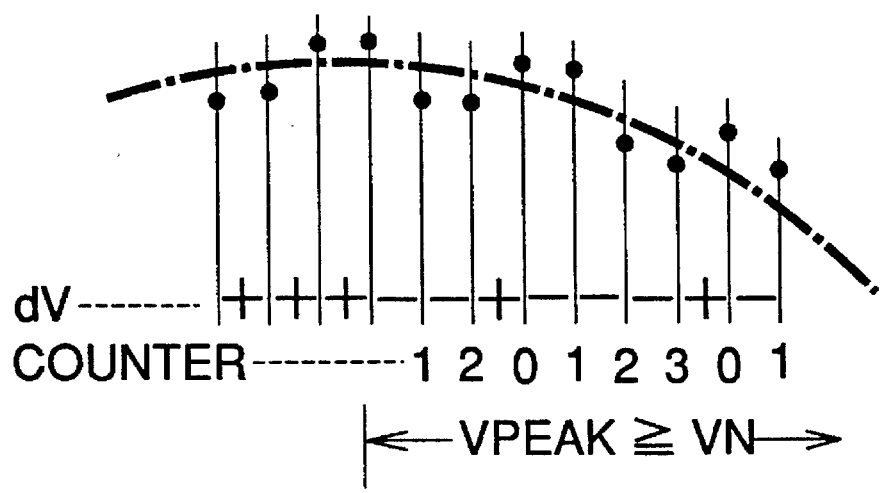

Further, the detection of conversion from the increasing tendency to the decreasing tendency may be alternatively performed in such a manner that the variation during a predetermined detecting period is detected at intervals of such a detecting period so as to determine whether the variation is of a plus tendency or a minus tendency. The determination is then performed as to whether the minus tendency has been continuously counted by a predetermined number of times after the tendency has been converted from the plus one to the minus one. With this determination, the counted number smoothly increases after the battery voltage has been converted from the increasing tendency to the decreasing tendency. However, with this alternative measure, relatively smaller variation in the battery voltage may be accidentally detected as the conversion. This phenomenon is illustrated in FIG. 13. If the battery voltage has been detected to have values indicated by black points under influence of the variation in the power source voltage, the counter may be reset to "0" even if the battery voltage is of the decreasing tendency. Therefore, the counting operation may not be reliably performed. On the other hand, in case of the above embodiment, the comparison is not performed in connection with the variation of voltage during the predetermined detecting period but is performed in connection with the maximum voltage, and therefore, the detection can be reliably performed as shown in FIG. 12.

Figure 7:
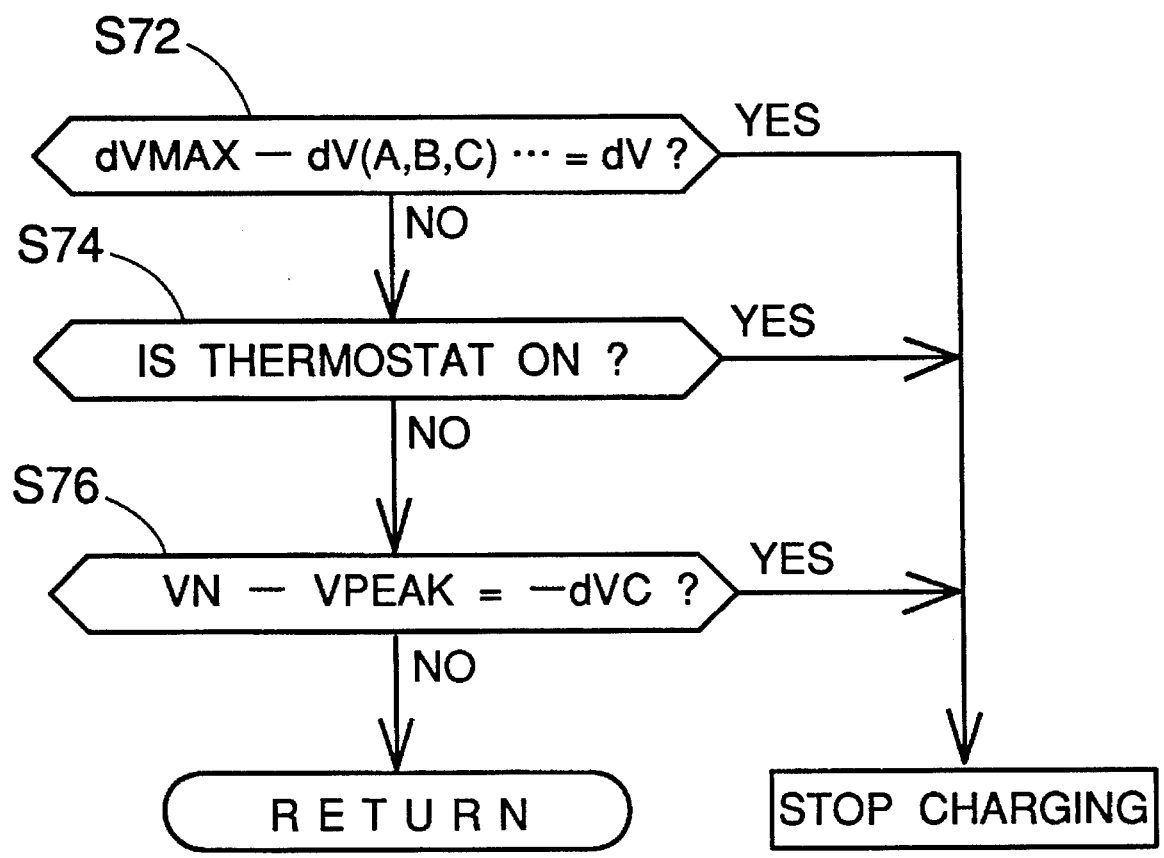
FIG. 7 is a block diagram showing a modification in the process of the embodiment.

Further, in the above embodiment, the process of Steps S18 to S20 in FIG. 5 for extraction of the peak voltage may be performed after the determination in Step S24 has become YES. Additionally, Step S24 may be followed by a process as shown in FIG. 7. Thus, a plural number of different measures may be included in the circuit which is operable to detect the timing of conversion from the increasing tendency to the decreasing tendency and which is operable after the battery voltage reaches the value equal to the sum of the predetermined potential difference dVS and the battery voltage V1 appeared when the predetermined time T1 has elapsed.

In Step S72 shown in FIG. 7, the microcomputer 18 detects the timing when the variation of voltage dV during the predetermined period becomes equal to a value which corresponds to the subtraction of a predetermined value from a maximum variation in the voltage dVMAX. The predetermined value is appropriately determined according to each rating voltage of the battery 10 such that the determination in Step S72 becomes YES immediately before the timing of conversion from the increasing tendency to the decreasing tendency of the battery voltage. Step S72 may be incorporated in place of Steps S26 to S32 or in addition to these steps.

Step S74 is operable to detect the conversion from the increasing tendency to the decreasing tendency as the case of the above embodiment. Thus, a battery has such a characteristic that the temperature of the same is abruptly increased after the battery has been fully charged. A thermostat is therefore set to be switched at such increased temperature of the battery, so that the timing of full charging can be detected in Step S74.

Step S76 is operable to detect the timing when the battery voltage VN is decreased from the maximum voltage VPEAK by a predetermined value (dVC). The timing of full charging of the battery can be recognized by determining the absolute value of the predetermined value dVC to have a smaller value. It is also within the scope of the present invention to determine that any one or more of the processes in Steps S26 to S32, Step S72, Step S74 and Step S76 is performed only when the determination in Step S24 has become YES.

The process in Step S72 will now be described in detail.

Figure 1B:
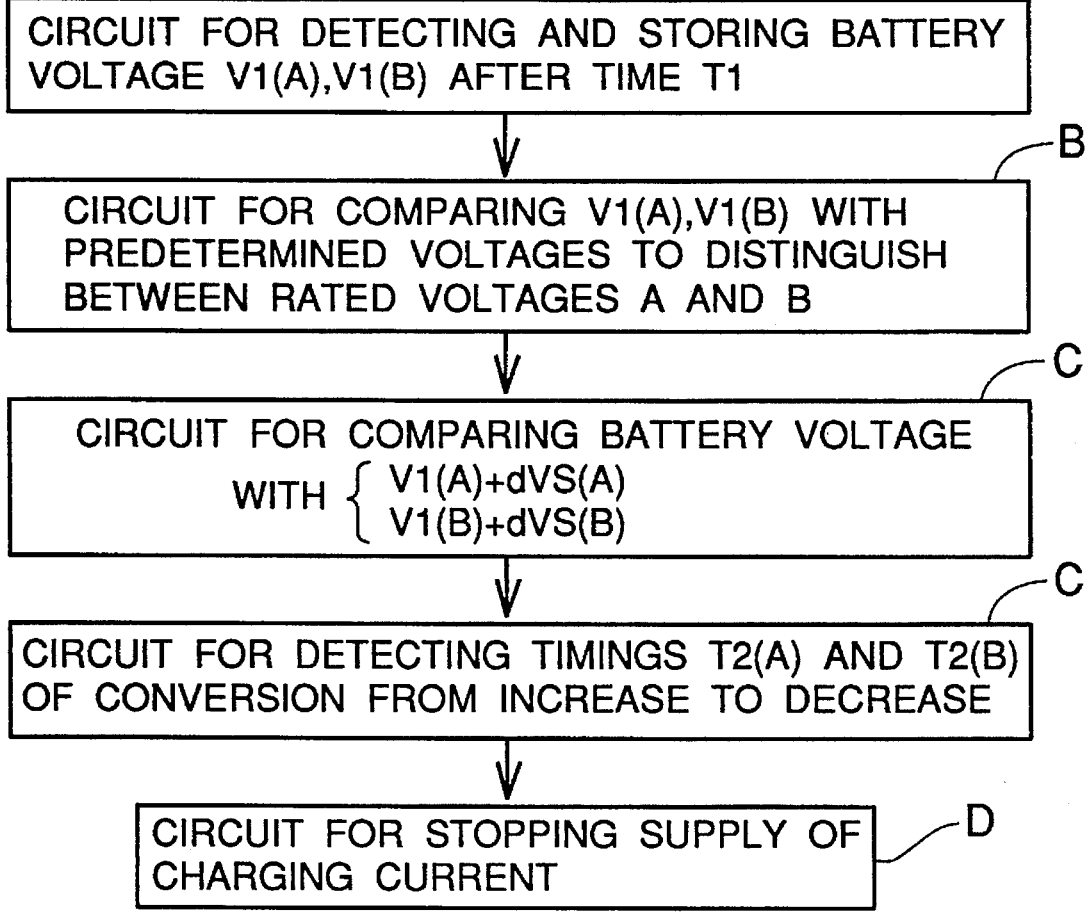
Figure 2A:
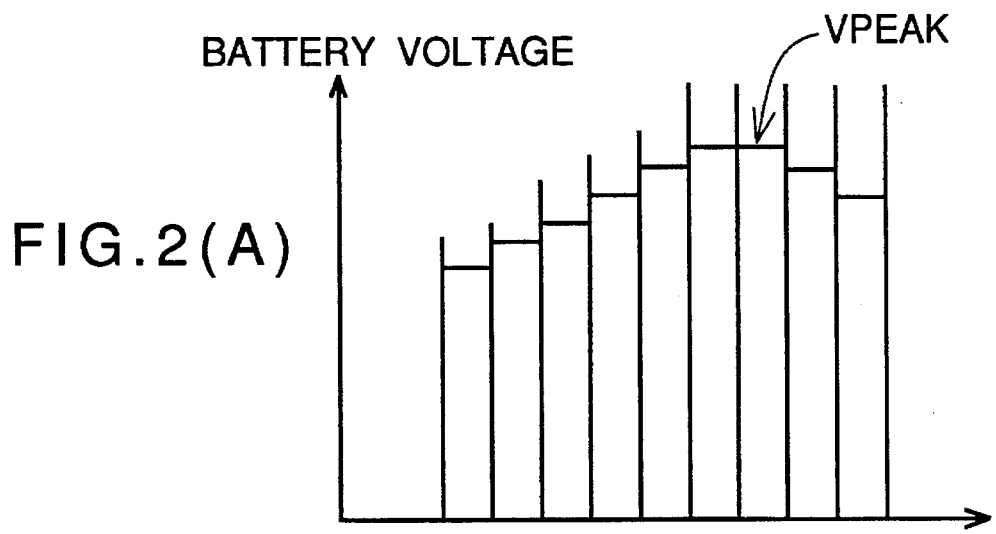
FIGS. 2(A) to 2(C) are diagrams generally showing the construction and the operation of the present invention.
Figure 2B:
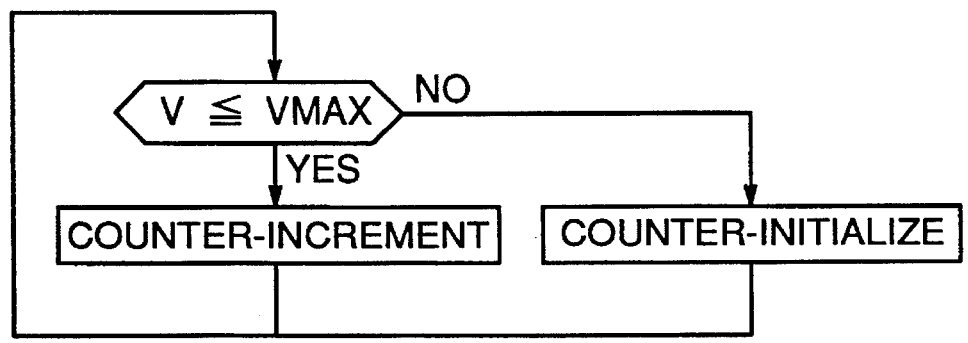
Figure 2C:
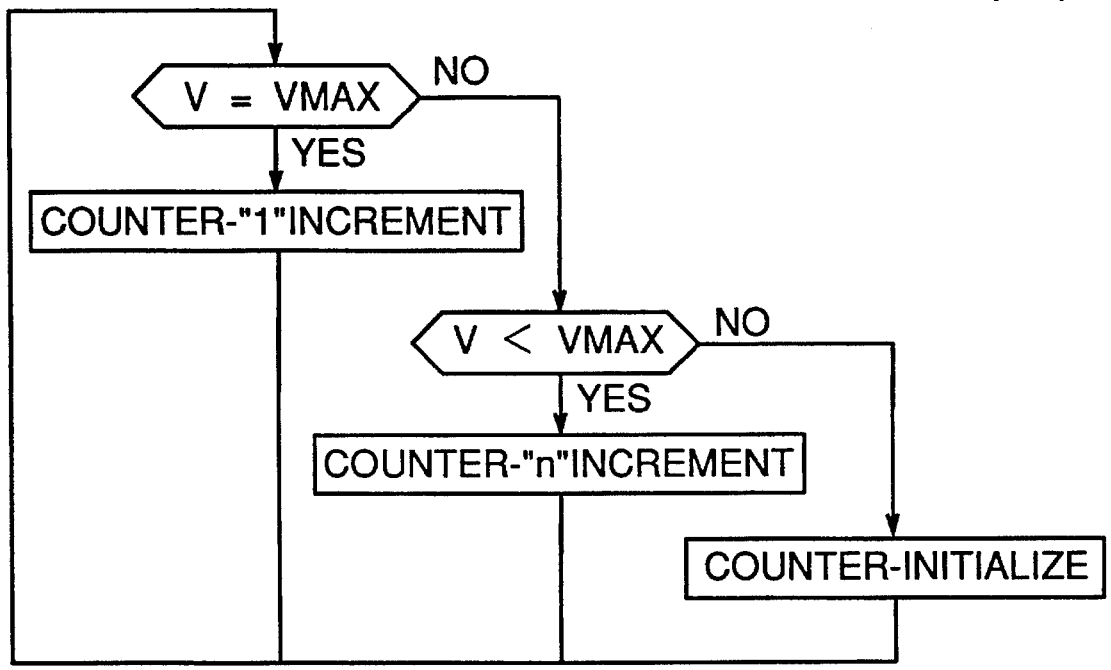
Figure 9:
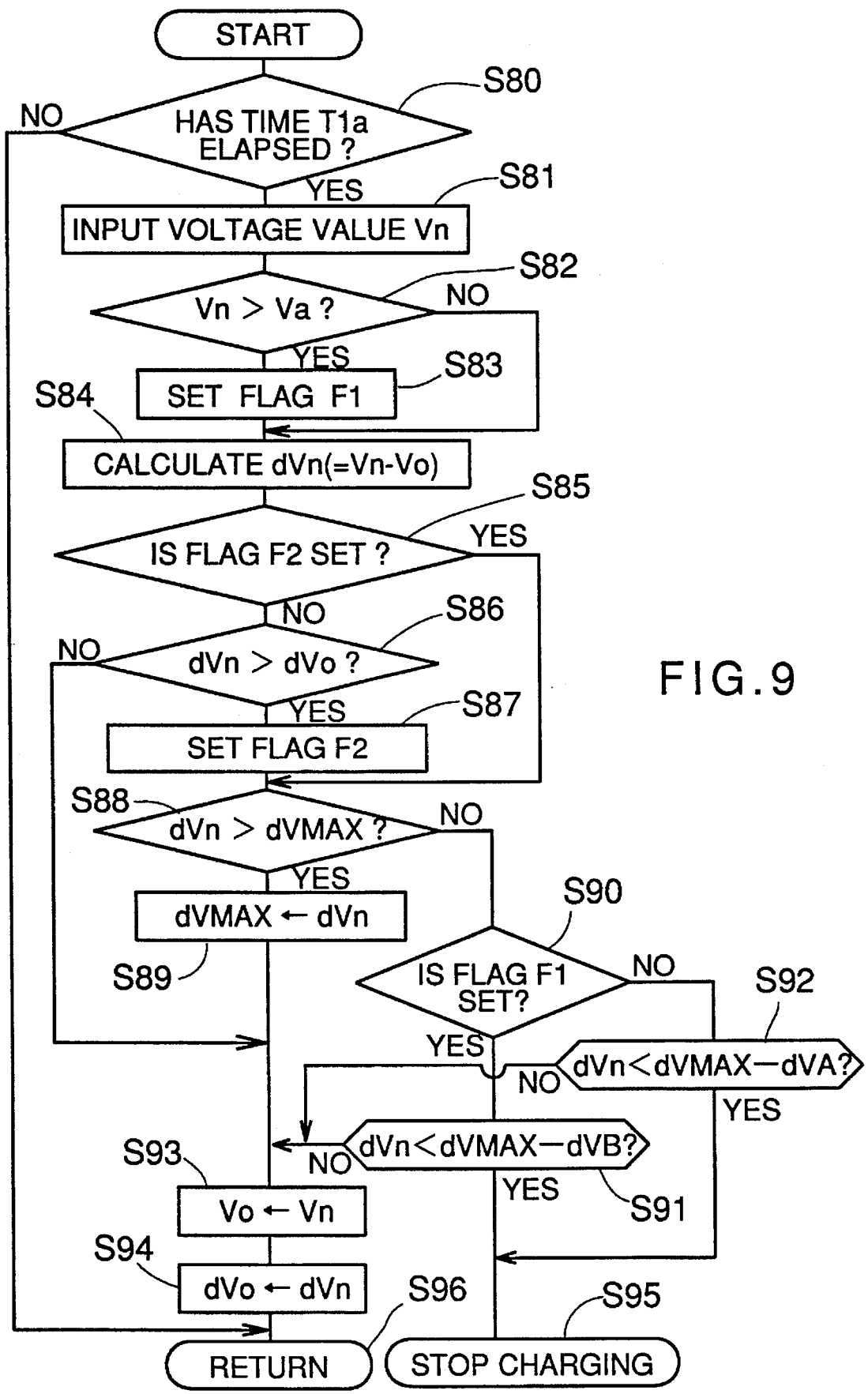
FIG. 9 is a block diagram of a different process performed in the embodiment.

FIG. 9 shows the process performed in Step S72 by the microcomputer 18. In Step S80, the determination is performed as to whether a predetermined time T1a has elapsed after starting the charging operation. If the time T1a has not elapsed, the process proceeds to Step S96 and skips the intervening steps. Here, the time T1a is determined to be substantially equal to the time T1 which has been described in connection with FIG. 1 and which corresponds to the time under influence of the temporary abrupt variation in case of the charging operation of the over-discharged battery.

Step S81 and its subsequent steps are performed at intervals of a predetermined time dT1 after the time T1a has been elapsed. In Step S82, a battery voltage Vn is compared with a predetermined value Va. Here, the predetermined value Va is so determined that the battery 10 can be distinguished by this value Va as to whether the battery 10 is the one having the rating voltage of 12.0 V or the one having the rating voltage lower than 12.0 V. The determination in Step S82 becomes YES if the battery 10 having the rating voltage of 12.0 V is charged while the determination becomes NO if the battery 10 having the rating voltage of 9.6 V or 7.2 V is charged. If the battery 10 having the rating voltage of 12.0 V is charged, flag F1 is set in Step S83. On the other hand, Step S83 is skipped in case of the rating voltage of 9.6V or 7.2V and the flag F1 is not set in this case.

Figure 8:
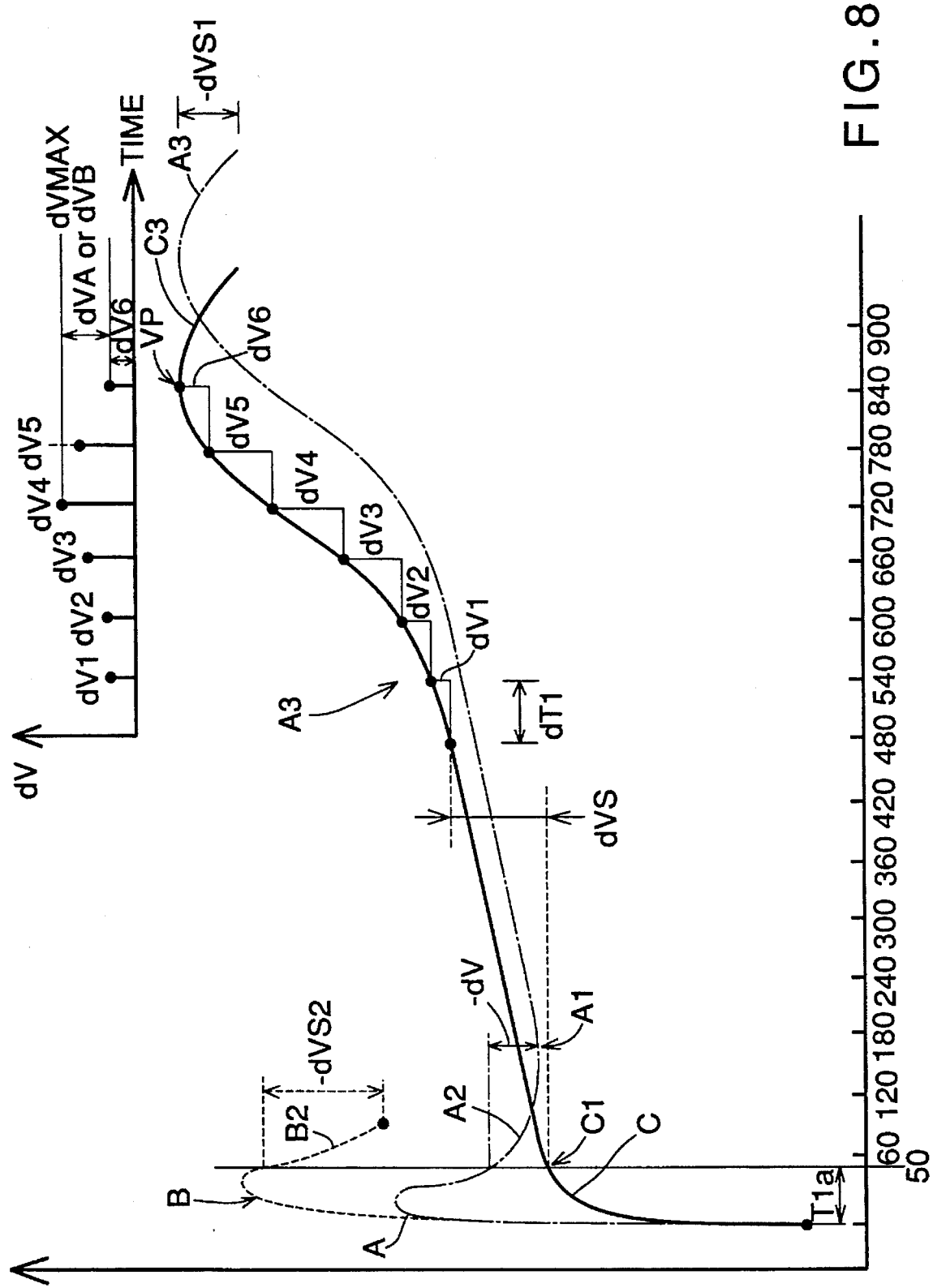
FIG. 8 is a graph showing variation in battery voltage.

The process then proceeds to Step S84 in which the microcomputer 18 calculates the variation of the battery voltage Vn at that time from battery voltage Vo which has been detected before that time by the time dT1 and the calculated value is stored as dVn. Such a calculated value dVn corresponds to dV shown in FIG. 8. In FIG. 8, the values of the affixed numerals are incorporated for convenience's sake, and the time is shown by an enlarged scale.

The process further proceeds to Step S85 in which the microcomputer 18 determines as to whether flag F2 is set. Step S87 serves to set such flag F2, and the flag F2 is set on the condition that the relationship dVn>dVo resulted or that the variation dVn within the predetermined period dT1 is larger than the previous variation dVo. In case of the example shown in FIG. 1(A), the variation within the predetermined periods may not be changed during line part A2, and the variation is considerably changed during line part A3 or B3 or the rate of increase of voltage is raised during these line parts. The flag F2 is therefore set after the voltage has become increased along line parts A3 or B3.

The step S86 is performed at intervals of the time dT1 as long as the flag F2 is not set during the period of line part A2. When the charging operation is proceeded to reach the period of line part A3 or B3, and consequently the flag F2 has been once set, the process skips Steps S86 and S87. Here, the timing of determination for YES in Step S86 substantially corresponds to the timing of determination for YES in Step S24 in FIG. 5.

Step S88 is performed when the rate of increase of the battery voltage has become raised according to line part A3 or B3. In Step S88, the microcomputer 18 determines as to whether the variation dVN at that time is larger than the maximum variation dVMAX obtained by that time. As long as the determination during the period of dV1–dV2–dV3–dV4 in FIG. 8, the variation at that time becomes larger than the maximum variation obtained by that time, and therefore, the maximum variation is renewed in Step S89. On the other hand, the determination in Step S88 becomes NO during the period of dV4–dV5 in FIG. 8, so that the process proceeds to Step S90 after the variation at that time has been taken as the maximum variation.

In step S90, the microcomputer 18 distinguishes the rating voltage of the battery 10 among 12.0 V, 9.6 V and 7.2 V. In case that the rating voltage is 12.0 V, the process proceeds to Step S91 in which the microcomputer 18 determines as to whether the variation dVn at that time is less than the value of the subtraction of dVB from the maximum variation dVMAX by that time. As will be seen from FIG. 8, in case of the battery 10 having the rating voltage of 12.0 V, the battery 10 is fully charged at the time when the variation (dV6 in this case) reaches the value of the subtraction of dVB from the maximum variation dVMAX (dV4 in this case). Thus, the determination in Step S91 becomes NO in case of the variation dV5, while it becomes YES in case of the variation dV6. If the determination in Step S91 is YES, the process proceeds to Step S95 in which the charging operation is stopped.

In case of the battery 10 having the rating voltage of 9.6 V or 7.2 V, the determination in Step S90 becomes NO, and the process then proceeds to Step S92 in which the microcomputer 18 determines as to whether the variation dVn at that time is less than the value of the subtraction of dVA from the maximum variation dVMAX by that time. As the case of the rating voltage of 12.0 V, the battery 10 is fully charged at the time when the variation dVn reaches the value of the subtraction of dVA from the maximum variation dVMAX. Here, dVA and dVB are previously determined according to the rating voltage of the battery 10, and a proper timing substantially corresponding to the timing of full charging of the battery 10 can be obtained by selectively incorporating these values dVA and dVB.

If the battery 10 is still in the course of charging, the process proceeds to Steps S93 and S94 in which the previous battery voltage Vo and the previous variation dVo are renewed to the present ones, respectively, for the next steps. As will be seen from this embodiment, by means of Steps S91, S92 and S95, the process for stopping the charging operation is carried out when the variation dVn becomes less than the value of the subtraction of dVA or dVB from the maximum variation dVMAX. Further, the process for storing the maximum variation dVMAX is carried out by Steps S88 and S89.

Figure 10:
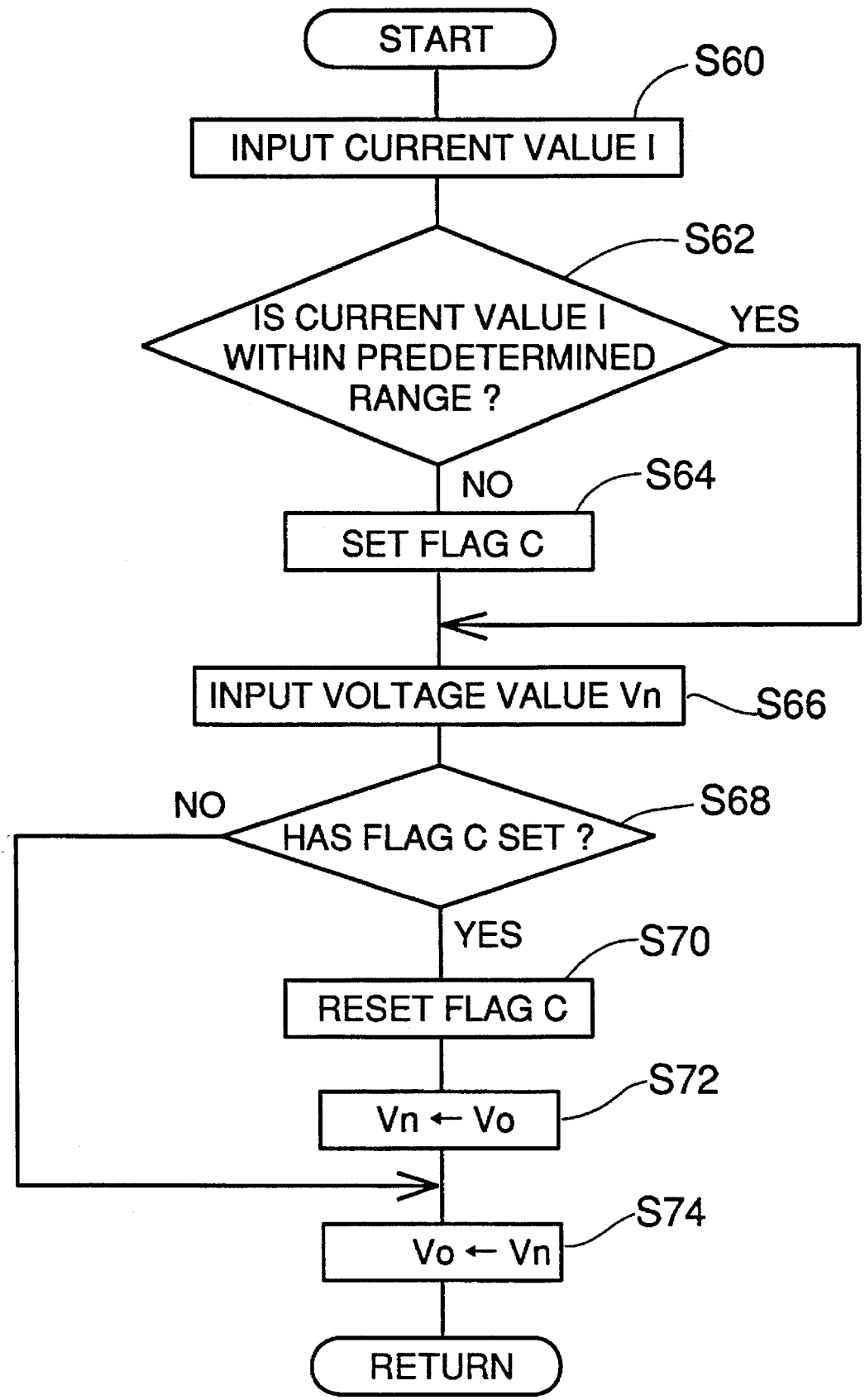
FIG. 10 is a block diagram of a further different process performed in the embodiment.

Additionally, in order to prevent an occurrence that the temporary extraordinary battery voltage caused by the variation in the power source voltage, etc. is brought into Step S16 in FIG. 5 or Step S81 in FIG. 9, a process as shown in FIG. 10 is provided. This process is programmed to be repeatedly performed at intervals of a very short time.

Figure 11:
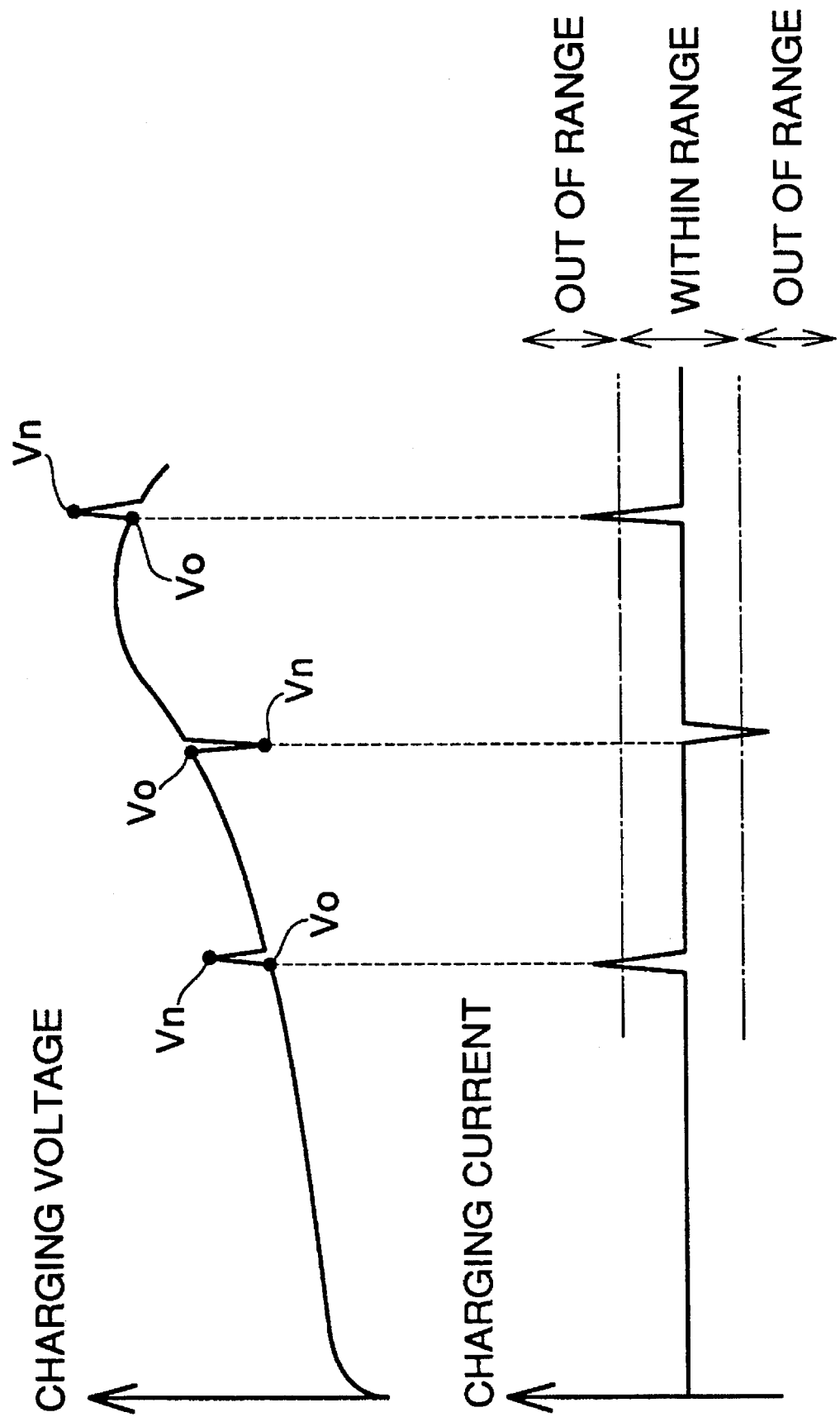
FIG. 11 is an explanatory graph of the operation of the process shown in FIG. 10.

Firstly, a value I of the charging current is inputted in Step S60. The process then proceeds to Step S62 in which the microcomputer 18 determines as to whether the value I is within a predetermined range. As shown in FIG. 11, the charging current is normally controlled to have a predetermined value. However, the charging current may be varied under the influence of a significant variation in the power source voltage, etc., and therefore, the charging current may become out of the predetermined range.

If the charging current has become out of the predetermined range, the determination in Step S62 becomes NO, and the process proceeds to Step S64 in which flag C is set.

The process further proceeds to Step S68 via Step S66. In Step S68, the microcomputer 18 determines as to whether the flag C has been set or not. If the determination is NO, the battery voltage Vn which is inputted in Step S66 is utilized as it is. On the other hand, if the charging current is out of the predetermined range because of variation in the power source voltage, etc., the battery voltage Vo obtained just before is incorporated as the battery voltage Vn in Step S72, while the battery voltage Vo is in turn renewed to new one in Step S74. With this process, when the battery voltage Vn at that time has temporarily become to have an extraordinary value, the voltage Vn is replaced by the voltage Vo obtained just before, so that the influence of noises is prevented from directly reflecting on the control for stopping the charging operation.

As described above, with the present invention, it becomes easy to detect the timing of conversion from the increasing tendency to the decreasing tendency of the battery voltage when the battery voltage is substantially varied. Further, the detection of full charging is performed only on the condition that the mistake of detection may not be caused. Therefore, the detection can be made in a stable manner, and it becomes possible to use inexpensive components which provide a rough resolution power for detection.

While the invention has been described with reference to a preferred embodiment, it is to be understood that modifications or variation may be easily made without departing from the spirit of this invention which is defined by the appended claims.

What is claimed is:

1. A battery charger for supplying a charging current to a battery for charging the same, comprising:

first means for detecting a battery voltage (V1);

second means for storing the battery voltage (V1) detected by said first means when a predetermined time (T1) has elapsed after starting a charging operation;

third means for comparing said battery voltage (V1) with a predetermined voltage and for distinguishing the battery with respect to a rating voltage;

fourth means for detecting a timing of conversion from an increasing tendency to a decreasing tendency of the battery voltage, said fourth means being activated when the battery voltage detected by said first means exceeds the sum of a predetermined potential difference (dVS) and said battery voltage (V1) detected by said first means when said predetermined time (T1) has elapsed; and fifth means for stopping supply of the charging current when said fourth means has detected said timing of conversion;

said predetermined time (T1) being determined to be substantially equal to the time when an abrupt variation expected to be produced in the battery voltage at the beginning of the charging operation of an over-discharged battery is substantially diminished;

said predetermined potential difference (dVS) being determined according to the rating voltage of the battery to be charged; and wherein said fourth means for detecting said timing of conversion includes means for detecting the battery voltage at intervals of a predetermined period, and means for extracting a maximum voltage from among the detected battery voltages and for storing said maximum voltage; and wherein said timing is detected based on a determination as to whether a battery voltage equal to or less than said maximum voltage has been detected; and wherein said determination of detection of the battery voltage equal to or less than said maximum voltage is performed by counting the number of times of detection of the battery voltage, and wherein detection of the battery voltage equal to said maximum voltage is counted as one time and detection of the battery voltage less than said maximum voltage is counted as at least two times.

2. The battery charger as defined in claim 1, further including:

sixth means for detecting the battery voltage at intervals of a second predetermined period and for obtaining variations in the battery voltage during said intervals of said second predetermined period;

seventh means for extracting and storing a maximum variation among said variations obtained by said sixth means;

eighth means for stopping supply of the charging current when said variation detected by said sixth means becomes equal to the difference between said maximum variation and a predetermined value; and ninth means for selecting said predetermined value according to the rating voltage of the battery to be charged.

3. A battery charger for supplying a charging current to a battery for charging the same, comprising:

first means for detecting a battery voltage (V1);

second means for storing the battery voltage (V1) detected by said first means when a predetermined time (T1) has elapsed after starting a charging operation;

third means for comparing said battery voltage (V1) with a predetermined voltage and for distinguishing the battery with respect to a rating voltage;

fourth means for detecting a timing of conversion from an increasing tendency to a decreasing tendency of the battery voltage, said fourth means being activated when the battery voltage detected by said first means exceeds the sum of a predetermined potential difference (dVS) and said battery voltage (V1) detected by said first means when said predetermined time (T1) has elapsed; and fifth means for Stopping supply of the charging current when said fourth means has detected said timing of conversion;

said predetermined time (T1) being determined to be substantially equal to the time when an abrupt variation expected to be produced in the battery voltage at the beginning of the charging operation of an over-discharged battery is substantially diminished;

said predetermined potential difference (dVS) being determined according to the rating voltage of the battery to be charged; and wherein said fourth means for detecting said timing of conversion comprises means for detecting the battery voltage at intervals of a predetermined period, means for extracting a maximum voltage from among the detected battery voltages and for storing said maximum voltage, and means for determining whether a battery voltage equal to or less than said maximum voltage has been detected, thereby detecting said timing of conversion; and wherein said means for determining counts the number of times of detection of the battery voltage, and wherein detection of a battery voltage equal to said maximum voltage is counted once, and wherein detection of a battery voltage less than said maximum voltage is counted at least twice.

4. A battery charger for supplying a charging current to a battery for charging the same, comprising:

detecting means for detecting a battery voltage when a predetermined time has elapsed after starting a charging operation;

comparing means for comparing said battery voltage with a predetermined voltage and for distinguishing the battery with respect to a rating voltage;

conversion detecting means for detecting a timing of conversion from an increasing tendency to a decreasing tendency of the battery voltage, said conversion detecting means being activated when the battery voltage detected by said detecting means exceeds the sum of a predetermined potential difference and said battery voltage detected by said detecting means when said predetermined time has elapsed; and stopping means for stopping supply of the charging current when said conversion detecting means detects said timing of said conversion;

said predetermined time being determined to be substantially equal to the time when an abrupt variation expected to be produced in the battery voltage at the beginning of the charging operation of an over-discharged battery is substantially diminished; and said predetermined potential difference being determined according to the rating voltage of the battery to be charged;

wherein said conversion detecting means comprises means for detecting the battery voltage at intervals of a predetermined period, and means for extracting a maximum voltage from among the detected battery voltages and for storing said maximum voltage;

wherein said timing is detected based on a determination as to whether a battery voltage equal to or less than said maximum voltage has been detected;

wherein said determination is performed by counting the number of times of detection of the battery voltage, and wherein detection of the battery voltage equal to said maximum voltage is counted as one time and detection of the battery voltage less than said maximum voltage is counted as at least two times.

* * * * *